United States Patent [19]

Waddill et al.

[11] 4,291,403
[45] Sep. 22, 1981

[54] DIGITAL IMPLEMENTATION OF PARITY MONITOR AND ALARM

[75] Inventors: John W. Waddill, Plano; Bahram Pourmand, Richardson, both of Tex.

[73] Assignee: Rockwell International Corporation, El Segundo, Calif.

[21] Appl. No.: 41,452

[22] Filed: May 22, 1979

[51] Int. Cl.³ .................... G06F 11/30; H04B 17/00
[52] U.S. Cl. .................................................. 371/5
[58] Field of Search ............. 371/5; 364/200 MS File, 364/900 MS File

[56] References Cited

U.S. PATENT DOCUMENTS

| | | | |
|---|---|---|---|
| 3,036,290 | 5/1962 | Zarouni | 371/5 |
| 3,721,959 | 3/1973 | George | 371/5 |
| 3,916,379 | 10/1975 | Dulaney et al. | 371/5 |
| 4,061,997 | 12/1977 | Niethammer et al. | 371/5 |
| 4,070,647 | 1/1978 | Robson | 371/5 |
| 4,080,589 | 3/1978 | Kline | 371/5 |

*Primary Examiner*—Charles E. Atkinson
*Attorney, Agent, or Firm*—Richard K. Robinson; Howard R. Greenberg; H. Fredrick Hamann

[57] ABSTRACT

A digital bit error violation rate circuit monitors the bit error integrity of a data stream and generates an alarm if the bit error rate exceeds an established bit error integrity threshold.

2 Claims, 3 Drawing Figures

DIGITAL IMPLEMENTATION OF PARITY MONITOR AND ALARM

BACKGROUND OF THE INVENTION

The invention relates generally to a circuit for monitoring the bit error integrity of a digital data system and converting it to the bit error rate.

In electronic data transmissions, the quality or reliability of the transmission system may be expressed in terms of a bit error rate, i.e., the number of erroneously received digital pulses per unit of time divided by the data rate of the communication channel. The bit error rate is determined by a number of factors including intersystem interference, noise, fading, equipment misadjustment and the like.

One prior art method of improving the quality of a data transmission channel has been through the use of automatic gain control in the receivers. Provisions are made to switch channels when the gain control feedback signal exceeds certain limits. While this method can detect a weak or faded signal, signal distortion due to noise is not identified and may go undetected.

Another method employs the transmission of a known pattern of data as a means for checking the received data for accuracy. Of course, this drawback to the technique is that normal transmissions on the channel being checked must be interrupted for transmission of the known pattern.

It is often necessary, particularly in the case of "hot standby" and diversity systems to have a continuous rapid response and reasonably accurate estimate of whether the bit error rate of a digital system such as a digital radio exceeds some predetermined threshold. This estimate should include the effects of degradation in alignment of the modulator, RF and IF circuit, the carrier recovery, phase detector and clock recovery portion of the demodulators and the effects of distortion. Such an estimate in prior art could be obtained in the "mod demod section" by using a pseudo-error detector. The pseudo-error detector provides a measure of the quality of the eye pattern and from this measurement a close approximation of the actual bit error rate could be extrapolated. Reference may be made to U.S. Pat. No. 3,721,959 and also to copending application, "Automatic Clock Positioning Circuit For A Digital Data Transmission System", Ser. No. 965,960, filed on Dec. 4, 1978, and assigned to the assignee of the present invention which discusses further the use of pseudo-error detectors as an on-line means of monitoring the bit error integrity.

For further discussion relating to error detection, reference may be made to: D. J. Godding, "Performance Monitor Techniques for Digital Receivers Based on Extrapolation of Error Rate", *IEEE Transactions on Communication Technology*, Vol. COM-16, pp. 380-387, June 1968; S. B. Weinstein, "Estimation of Small Probabilities by Linearization of the Tail of a Probability Distribution Function", *IEEE Transactions on Communication Technology*, Vol. COM-19, pp. 1149-1155, December 1971; and, B. J. Leon, H. L. Hammond, Jr., P. A. Vena, W. E. Sears, III and R. T. Kitahara, "A Bit Error Rate Monitor for Digital PSK Links", *IEEE Transactions on Communications*, Vol. COM-23, pp. 518-525, May 1975, which detail analytical studies of the subject, especially when related to FSK, BPSK and WPSK signals, and broadly to all forms of digital transmission.

Although the above references provide techniques for detecting error rates and pseudo-error rates, they fail to provide a digital means for measuring the bit error rate on-line without switching modes of operation. It has been found that the bit error rate which cannot be measured when in service can be related by the techniques disclosed herein, to the bit error integrity which can, by use of the disclosed circuit, be measured and an alarm can be given indicating the degradation of a communication channel and thus allow an operator to take corrective action such as the switching of communication channels.

SUMMARY OF THE INVENTION

A digital bit error violation rate circuit monitors the bit error integrity of a data stream and generates an alarm if the bit error rate exceeds an established bit error integrity threshold. The mathematical relationship of the bit error integrity to the bit error rate is discussed and the circuitry for implementing the mathematical relationship is provided and includes a means for generating a time period that is to be compared with the accumulated error count. In the event the accumulated error count exceeds a selected error threshold within the time period, an alarm will be generated and a second error threshold will be used to compare any subsequently accumulated errors.

In order to determine if a communication channel is subjected to degradation, it is necessary to determine the bit error rate, and as discussed earlier in the prior art systems, it was necessary to cease communication on a channel in order to determine the bit error rate. However, as disclosed herein, the bit error rate can be extracted from the bit error integrity. Thus, one of the critical monitoring steps in transmitting a digital data stream is that of the bit error integrity. The step necessary to implement the invention is to monitor the performance of a digital data stream by counting the number of error bits which can be detected by a parity error detector or one of the cyclic error checking code detectors that occur in the system over a defined period of time and relative to the bit error rate either declares an alarm or a no alarm condition. The mathematical relationship of the bit error integrity versus the detected bit error rate and other relationships for a digital data stream are provided herein.

The implementation of the invention ensures that as long as there is degradation of the communication channel an alarm condition will exist. If the degradation is only momentary, then the alarm condition will be removed upon the reduction of the error count below the threshold level. This and many other objects and purposes of the invention will be clear from the following detailed description of the invention.

DETAILED DESCRIPTION OF THE INVENTION

In a communication system where the information bits in a digital data stream are statistically independent and are transmitted at a given rate such as 44,736 Mb/s (megabits per second) and are transmitted in a binary format, that includes an error checking code, preamble, framing and stuffing bits. For example, in the system of the preferred embodiment, the major frame format, contains 44,760 bits of which 4,074 bits are information bits and 54 bits are framing, plus stuffing, and error checking, such as a parity checking code. The error violation threshold can be obtained by the equation $v=[(\eta l)/(\delta t)]$. Where $v=$ the error violation threshold; $\eta =$ number of error violations allowed to occur in a time period t; $\delta =$ data rate Mb/S; t = time integrals in which the error bits in violations are counted; and l = number of data bits between each error checking code.

Since the data transmission line performance specification is usually set in terms of bit error rate which, as mentioned earlier, cannot be measured when in service, then the relationship between the bit error rate and the error violation rate (or bit error intensity) can be established by the equation:

$v = (1-b_l)(1-\epsilon) + b_l\epsilon$. Where $\epsilon =$ bit error rate of the system; $b_l =$ Probability of having an even number of bit errors in l information bits. If $l > b$ for any system and l = any number of bits in a data format such as 4,760 bits, then the equation $v=(1-i_l)(1-\epsilon)+b_l\epsilon$ can be solved for $b_l$ which then becomes $b_l=(1-\epsilon)b_{l-1}+[(1-b_{l-1})$ with $b_o = 1$. The generator function is thus $$B(s) = \sum_{l=o}^{\infty} b_l s^l \text{ for } -1 < S < 1.$$

When $b_l = (1-\epsilon)b_{l-1} + \epsilon(1-b_{l-1})$ is multiplied by $S^l$ and added for all positive even integer values of l we obtain $B(s) = \frac{1}{2}\{(1-s)^{-1} + [1-(1-2)S]^{-1}\}$ which is a geometric series that can be reduced to $$b_l - \frac{1(1-\epsilon)^l}{2}.$$

Substituting $$b_l - \frac{1+(1-\epsilon)^l}{2}$$

into $v = (1-b_l)(1-\epsilon) + b_l\epsilon$ and solving for $$v; v = 1 - \frac{(1-2\epsilon)^l}{2} \times (1-\epsilon) + \frac{1(1-2\epsilon)^l\epsilon}{2}$$

which when $l\epsilon <<< 1$, $v$ becomes $v \approx (l+1)\epsilon$. In the case of the preferred embodiments, $v$ would be equal to $4,761\epsilon$.

Figure 1:
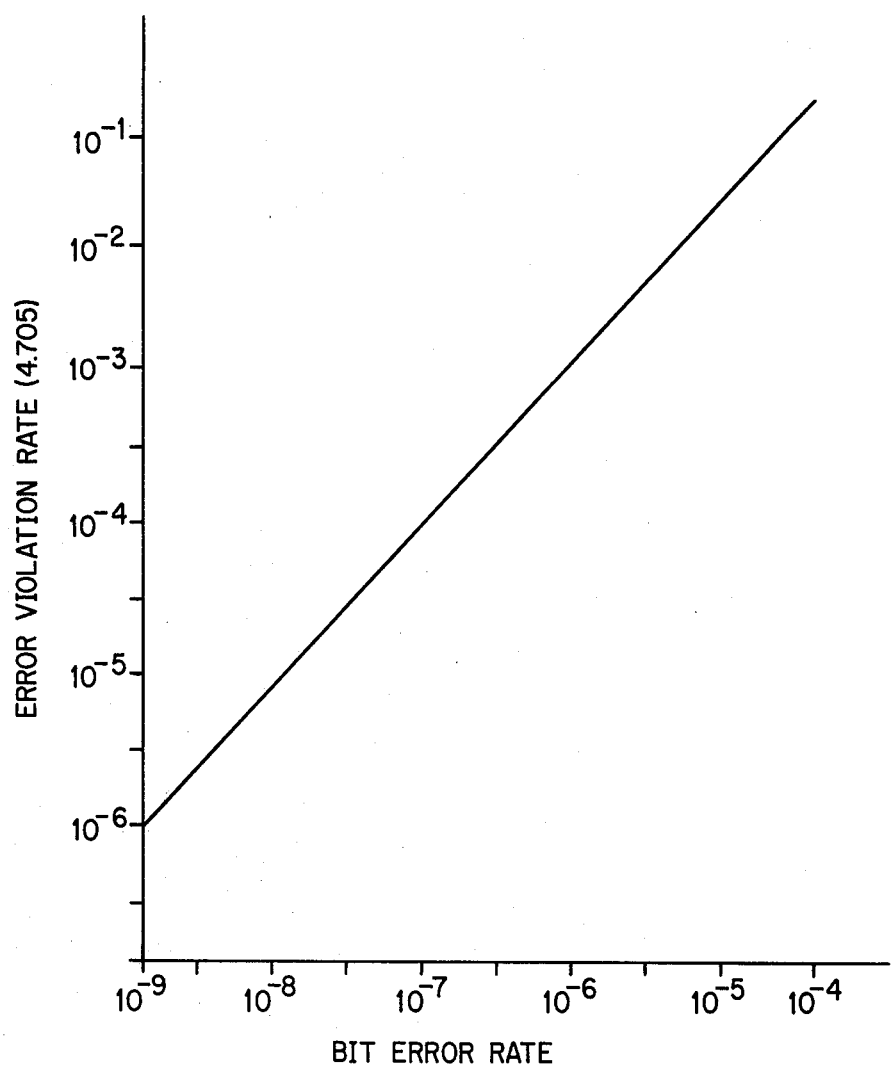
FIG. 1 is a graph of the bit error rate versus the bit error violation according to the invention.

FIG. 1 is a graph of the bit error rate versus the error violation rate in which the abscissa is the logarithmic plot of the bit error rate and the ordinate is the error violation rate. It can be seen from the curve of FIG. 1 as well as the equation $v=[(\eta l)/(\delta t)]$ that the bit error integrity of a digital system can be monitored for any bit error rate as long as $l\epsilon < 1$.

Figure 2:
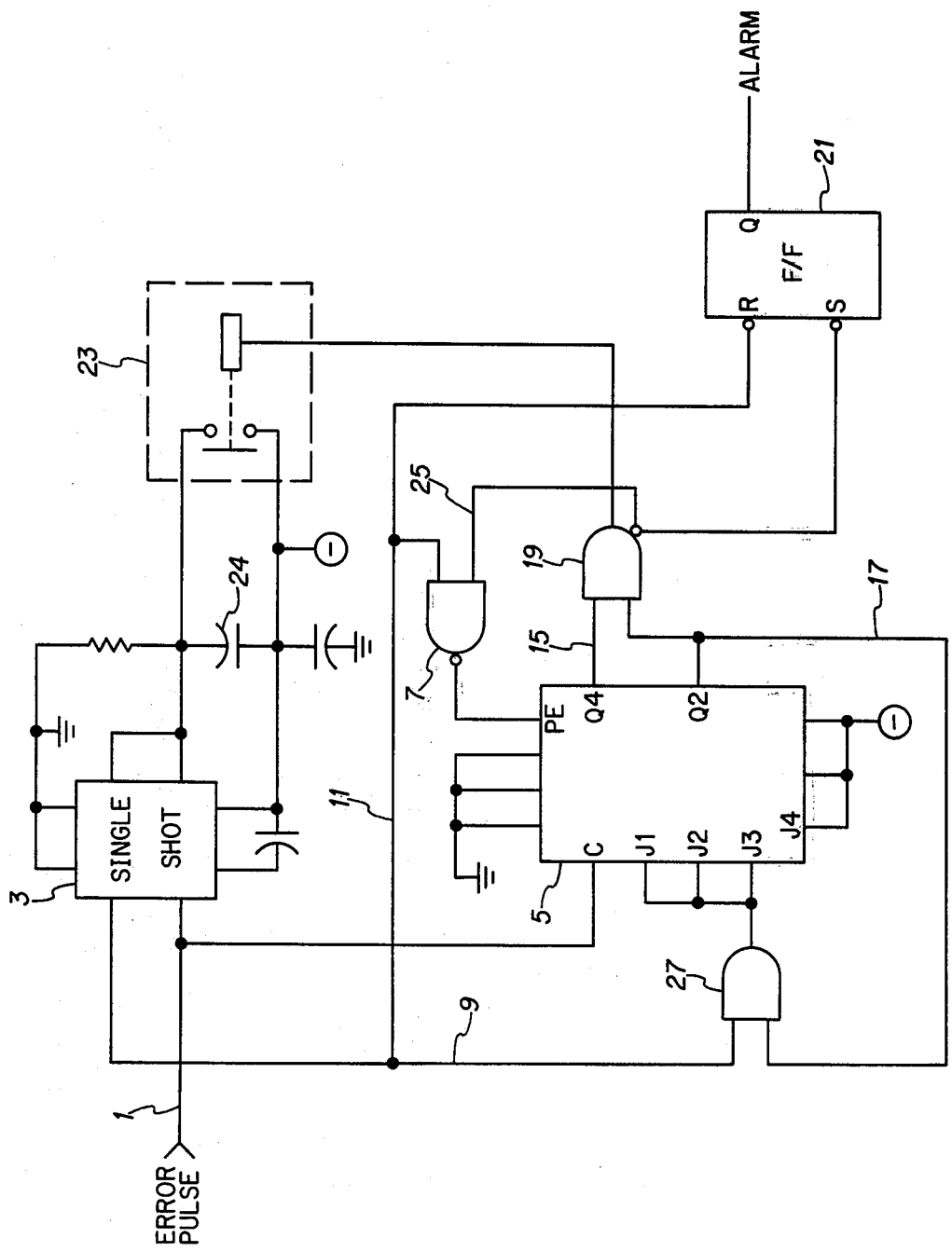
FIG. 2 is a schematic drawing of the circuitry necessary to implement the function represented by FIG. 1.

FIG. 2 is a circuit diagram of the circuitry that is used to digitally implement the above discussed relationship. The error pulses as detected from a parity error checker, a cyclic error code checker or other means are used to trigger a single shot multivibrator 3 by way of conductor 1. The single shot multivibrator can be any of the commercially available devices such as an NE 555, manufactured by Signetics Corporation and other semiconductor manufacturers or any of the other single shot multivibrators that are able to meet the design specifications. Knowing the desired bit error rate threshold, the bit error rate can be determined by using FIG. 1, or the equations $v \approx (l+1)$ and $v=[(\eta l)/(\delta \epsilon)]$ and considering that in the embodiment shown, l is equal to 4,760 bits, $\delta$ is equal to the data rate of 44.736 Mb/s which leaves two variables $\eta$ and t. $\eta$ can be determined with reference to confidence factor desired in declaring a channel degraded to the bit error rate threshold; for example if $\eta = 10$ and $\delta = 44.760$ Mb/s, then t is $=2.26$ sec. and $\epsilon = 10^{-7}$ which is the bit error rate threshold to sense an alarm which will be declared the first time with a probability of 50%. Once an alarm is declared there has to be some hysteresis built in the circuit in order to avoid oscillations. This is accomplished by then setting $\eta = 3$ and using $v=[(\eta l)/(\delta \epsilon)]$ with the other circuit equation parameters remaining the same, then $\epsilon$ would be equal to $0.3 \times 10^{-7}$ bit error rate threshold necessary to release an alarm.

Referring back to FIG. 2 the first error pulse is provided from the error checker on conductor 1 which triggers the single shot multivibrator 3 that provides an enabling signal to the counter 5 and the comparator that includes NAND gates 7 and AND gate 27 by means of conductors 11 and 9 respectively. In addition, the error pulse that triggers the single shot multivibrator also stores the first error count into the counter 5. As each subsequent error pulse is detected the counter accumulates the count until the threshold is reached. Once there has been an accumulated count that has reached the threshold for the embodiment of FIG. 2, the signals on the conductors 15 and 17 go high, which causes the NAND output of the gate 19 to go low setting the alarm flip-flop 21 to the alarm state and the gate 19's AND output causes the switch 23 to momentarily close thereby shorting the capacitor 24 and resetting the single shot multivibrator without the occurrence of a new trigger pulse. In addition to the above described operation, the NAND gate 7, provided there is still a positive signal on conductor 11, a negative signal on conductor 25, goes high and causes the preset input to "jam" load the counter 5.

The counter 5 is loaded with the positive inputs that are provided by the AND gate 27 and includes the signal that is present on conductor 9 from the single shot multivibrator as well as the signal that is present upon conductor 17 from the $Q_2$ output of the counter 5. At this time, the second time period of the single shot is in progress and each additional error pulse is loaded into the counter and in the case of the preferred embodiment as shown in FIG. 2, for three additional counts. At the occurrence of the three additional counts, the single shot multivibrator is again reset by the shorting of capacitor 24 through relay 23 and the alarm state remains and will continue thus until a time period expires without the accumulation of three errors.

In the case where the counter fails to accumulate the ten error counts prior to the single shot multivibrator timing out, then the counter is reset at the timing out of the single shot multivibrator 3.

Figure 3:
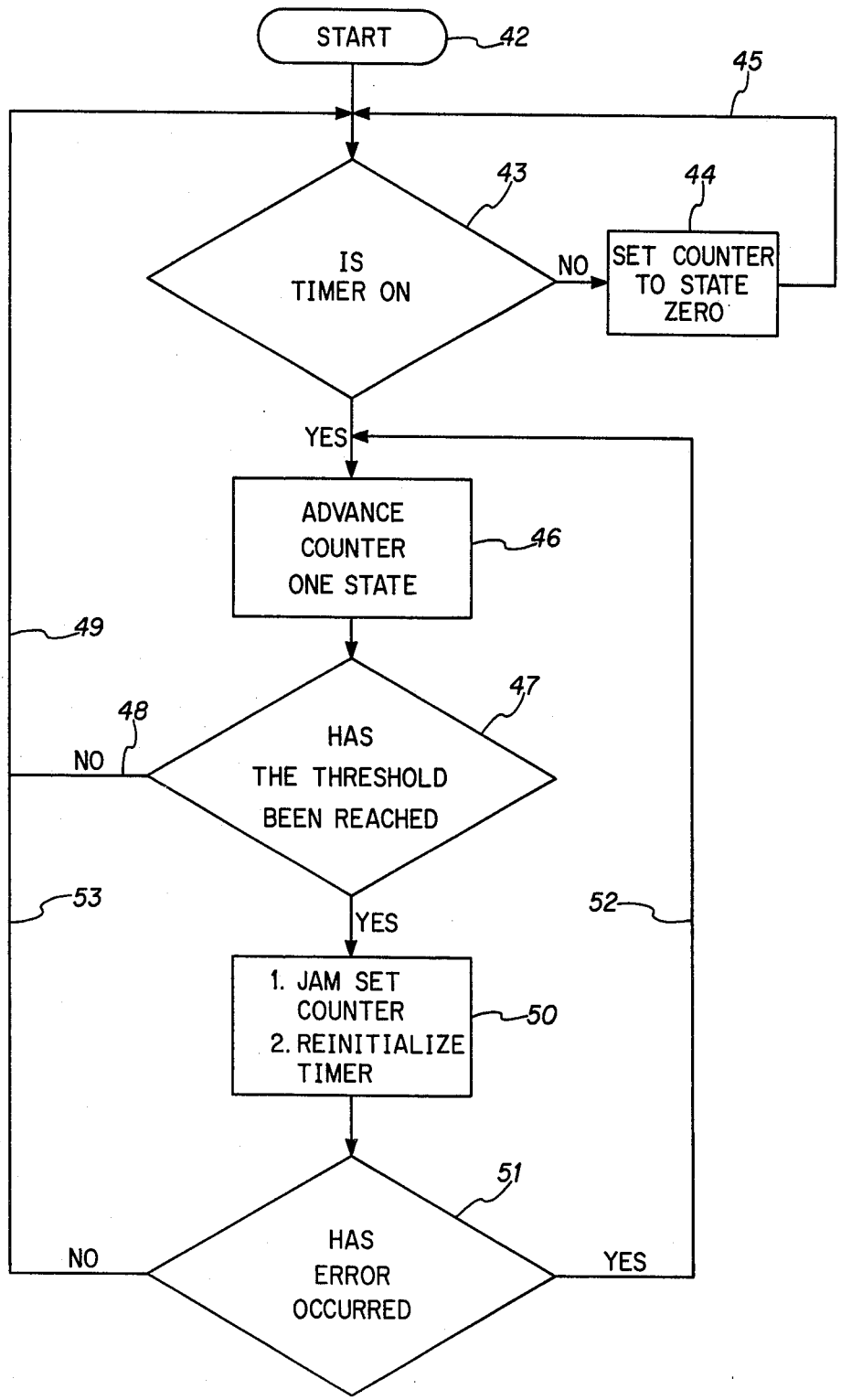
FIG. 3 is a flow diagram of the steps performed according to the invention.

FIG. 3 is a flow chart that represents the operation of the circuit diagram shown in FIG. 2 in which the start block 42 is at the rest state for the circuit. Upon the occurrence of the first error the system progresses to the first decision block 43 which checks to ensure that the timer is on and the counter is initialized. If the counter is not initialized, the feedback path that includes the process step of setting the counter to state zero at 44 and the loop path 45 is taken. If at the decision of block 43 the timer is on and the counter is initialized, then the counter advances one state at block 46. At decision block 47, the contents of the counter are checked to ensure that the counter has not reached the first threshold of counts, such as 10 for the embodiment of FIG. 2. If the counter has not accumulated enough counts to reach the threshold level, then by way of feedback lines 48 and 49, the system will return to the first decision block 43, check to see if the timer is on and at the occurrence of the next error it will advance the counter one state. Once the decision block 47 indicates that threshold level has been reached, then the next step is 50 where the alarm turned on counter is jammed set and the timer is reinitialized. After the step 50 has been performed, the monitoring and alarm circuit shown in FIG. 2 monitors for an error at step 51. If an error occurs feedback line 52 returns to the step block 46 where the counter is advanced one step. If at 51 an error has not occurred, then feedback lines 53 and 49 return to the start position and the counter is advanced one more step if at step 47 there are ten errors accumulated.

Although a single example was shown, in the implementation of the invention, it is obvious to one skilled in the art given the teachings of the inventions and the equations can modify the circuitry shown in FIG. 2 to accommodate different error thresholds. Although modification of the foregoing disclosures is possible without departing from the scope and spirit of the invention engendered thereby. Thus, the invention is not to be limited to the scope of the foregoing disclosure, but rather to the appended claims.

We claim:

1. An error monitor and alarm generator for providing an alarm signal when an error rate exceeds a first established threshold and for maintaining the alarm signal for as long as the error rate exceeds a second established threshold, the error rate being indicated by the accumulation of an error count, during a fixed period of time, of error pulses generated by an error code checker that checks periodically placed error codes on a digital data stream, the error monitor and alarm generator, comprises:

single shot multivibrator means for generating a time period, and for providing an enabling signal during the time period, the single shot multivibrator being triggered by the occurrence of a first error pulse;

presettable counter means for accumulating the error count which is updated at the occurrence of each error pulse;

detector circuit means for detecting when the error count accumulated by the presettable counter means exceeds a first preselected number of counts, and for providing an activate alarm signal at the detection of the error count exceeding the first preselected number of counts, the first preselected number of counts being related to the first established threshold in that when the first selected number of counts is accumulated during the time period the first established threshold has been exceeded;

flip-flop means for providing an alarm signal in response to the activate alarm signal, and for maintaining the alarm signal until the enabling signal is removed by the single shot multivibrator means;

switch means, responsive to the activate alarm signal and in response thereto, for reinitializing the time period;

circuit means, responsive to the activate alarm signal and in response thereto, for presetting the counter means to a second preselected number of counts, the presetting of the presettable counter means causes the activate alarm signal to be removed by the detector circuit means, the second established threshold being related to a difference between being the first preselected number of counts and the second preselected number of counts in that when the difference is accumulated during the reinitialized time period, the second established threshold has been exceeded.

2. A method for providing an alarm signal when an error rate exceeds a first established threshold, and for maintaining the alarm signal for an long as the error rate exceeds a second established threshold, the error rate being indicated by an accumulation of errors during a fixed time period, the errors being indicated by an error code checker that checks periodically placed error codes on a digital data stream, the method comprising the steps of:

establishing a reference time period at the occurrence of a first error;

accumulating the errors;

increasing an accumulated error count of accumulated errors by one, at each occurrence of each error;

providing an alarm when the accumulated error count accumulated during the time period exceeds a first predetermined error count, the first predetermined error count, when accumulated during the time period, indicates that the first established threshold has been exceeded;

reinitializing the reference time period upon exceeding the first established threshold as indicated by the accumulated error count exceeding the first predetermined error count during the reference time period; and maintaining the alarm state when the accumulated errors count accumulated during the reinitialized reference time period exceeds a second predetermined error count, the second predetermined error count, when accumulated during the reinitialized time period, indicates that the second established threshold has been exceeded.

* * * * *

UNITED STATES PATENT AND TRADEMARK OFFICE
CERTIFICATE OF CORRECTION

PATENT NO. : 4,291,403
DATED : September 22, 1981
INVENTOR(S) : John W. Waddill et al.

It is certified that error appears in the above—identified patent and that said Letters Patent is hereby corrected as shown below:

Column 3, line 19, "1" should read -- $\ell$ --.

Column 3, line 29, "1" should read -- $\ell$ --.

Column 3, line 31, "(1-i$\ell$)" should read -- (1-b$\ell$) --.

Signed and Sealed this

Twenty-seventh Day of April 1982

[SEAL]

Attest:

Attesting Officer

GERALD J. MOSSINGHOFF

Commissioner of Patents and Trademarks